United States Patent
Kuroda et al.

(10) Patent No.: US 7,394,750 B2
(45) Date of Patent: Jul. 1, 2008

(54) INFORMATION RECORDING MEDIUM, AND INFORMATION REPRODUCING APPARATUS AND METHOD

(75) Inventors: Kazuo Kuroda, Saitama (JP); Akira Imamura, Saitama (JP)

(73) Assignee: Pioneer Corporation, Tokyo (JP)

( * ) Notice: Subject to any disclaimer, the term of this patent is extended or adjusted under 35 U.S.C. 154(b) by 704 days.

(21) Appl. No.: 10/878,679

(22) Filed: Jun. 29, 2004

(65) Prior Publication Data

US 2005/0030855 A1 Feb. 10, 2005

(30) Foreign Application Priority Data

Jun. 30, 2003 (JP) ............................. 2003-186783

(51) Int. Cl.
G11B 7/00 (2006.01)
G11B 5/09 (2006.01)

(52) U.S. Cl. .............. 369/275.4; 369/275.3; 369/44.26; 369/13.55; 369/13.54

(58) Field of Classification Search .............. 369/275.4; 428/64.1
See application file for complete search history.

(56) References Cited

U.S. PATENT DOCUMENTS

| 5,377,178 | A | * | 12/1994 | Saito et al. | ............. | 369/124.07 |
| 5,999,504 | A | * | 12/1999 | Aoki | ......................... | 369/47.4 |
| 6,069,864 | A | * | 5/2000 | Kim | ........................... | 369/116 |
| 2003/0099172 | A1 | * | 5/2003 | Park et al. | ................ | 369/47.22 |

FOREIGN PATENT DOCUMENTS

| EP | 0 930 614 | 7/1999 |
| EP | 1 176 587 | 1/2002 |
| EP | 1 293 971 | 3/2003 |
| JP | 2003-085896 | 3/2003 |
| WO | 98/33176 | 7/1998 |
| WO | 03/094158 | 11/2003 |

* cited by examiner

*Primary Examiner*—Dwayne Bost
*Assistant Examiner*—Kezhen Shen
(74) *Attorney, Agent, or Firm*—Drinker Biddle & Reath LLP (57) ABSTRACT

A record mark is formed on a master disc DS. The record mark is formed substantially along a spiral standard locus, but a record mark position is displaced in a direction crossing the spiral standard locus according to record data. A wobble is formed such that the average value of the displacement of the record mark position is zero for each predetermined data unit with the standard locus as a reference.

6 Claims, 6 Drawing Sheets

| OFFSET VALUE | DATA ROW |
|---|---|
| 0 | A1,A2,A3,··· |
| 1 | B1,B2,B3,··· |
| 2 | C1,C2,C3,··· |
| ⋮ | ⋮ |

INFORMATION RECORDING MEDIUM, AND INFORMATION REPRODUCING APPARATUS AND METHOD

BACKGROUND OF THE INVENTION

1. Field of the Invention

The present invention relates to an information recording medium on which information is recorded by using a wobble, and an apparatus for and a method of reproducing information.

2. Description of the Related Art

In an optical disc represented by a Compact Disc (CD) and a DVD, the long or short length of a pit is used to record information. However, in order to record information for copy control for the prevention of illegal copying or the like, there is a request for reserving another recording area without decreasing a recording capacity by the pit.

As a method of increasing the recording capacity by other means except the method using the long or short length of the pit, there is known a technique of displacing or shifting the position of the pit in the radial direction of the optical disc. This technique is that information is recorded by wobbling the position of the pit in the radial direction of the optical disc and by performing spread spectrum with respect to the wobble (e.g. Japanese Patent Application Laying Open NO. 2003-85896).

This technique is such that a wobble signal is generated by performing spread spectrum with respect to predetermined data with random data and that the position of a record mark is wobbled according to the wobble signal. Since the frequency component of the wobble is expanded by spread spectrum, it is possible to decrease crosstalk from an adjacent track to some extent.

However, if spread spectrum is performed by using the random data, "0" or "1" long continues or appears disproportionately with some probability. In this case, the record mark is formed at a position out of the center of the track. If such a record mark that is out of the center of the track is read, an optical pickup moves to follow the deviation of the record mark, thereby to generate a tracking offset. As a result, problems occur, such as tracking error by jumping to the adjacent track and the decrease of data reliability by crosstalk from the adjacent track. These are big problems, particularly in an optical disc with a high recording density and a narrow track pitch.

SUMMARY OF THE INVENTION

It is therefore an object of the present invention, for example, to provide an information recording medium whose data reliability is improved, as well as an information reproducing apparatus for and method of reproducing such an information recoding medium.

The present invention will be explained hereinafter. An information recording medium of the present invention may be disc-shaped and may comprise various optical discs, such as a CD, a Compact Disc-Read Only Memory (CD-ROM), a DVD, and a DVD-ROM, for example.

The above object of the present invention can be achieved by an information recording medium on which a wobble is formed by displacing a record mark position in a direction crossing a spiral standard locus according to record data, wherein the wobble is formed such that an average value of displacement of the record mark position with the standard locus as a reference is zero for each predetermined data unit of the record data.

According to the information recording medium of the present invention, the record mark is formed on the information recording medium. The record mark is formed substantially along a spiral standard locus, but a record mark position is displaced in a direction crossing the spiral standard locus according to record data, which forms a meandered wobble. The record mark is a pit, for example, and the first information is recorded by the variable length (i.e., the long or short length) of the record mark. Aside from this, the second information is recorded as the record data by the meandering or wobbling of the record mark. The wobble, which is a series of record marks, is formed such that the average value of the displacement of the record mark position is zero by the predetermined data unit with the standard locus as a reference.

Upon reproducing the above-described information recording medium, tracking servo for moving an optical pick up along the wobbled track is performed. In the present invention, since the wobble is formed such that the average value of the displacement of the record mark position is zero by the predetermined data unit with the standard locus as a reference, the position of the optical pickup to return to the standard locus for a short time. As a result, it is possible to decrease tracking error by jumping to an adjacent track and crosstalk from the adjacent track, thereby to improve data reliability.

In one aspect of the information recording medium of the present invention, the wobble corresponding to the predetermined data unit is provided with: a first area; and a second area. The second area is formed so that the average value of the displacement of the record mark position with the standard locus as a reference in the second area is set to cancel the average value of the displacement of the record mark position with the standard locus as a reference in the first area.

According to this aspect, since, if the wobble is divided by the predetermined data unit of the record data, the average position of the record mark in the divided range agrees with the standard locus, it is possible to certainly improve data reliability.

In this aspect, the information recording medium may be constructed such that the record data corresponding to the predetermined data unit is provided with: main data; and cancel data having a DC offset value to cancel a DC offset value of the main data, the record mark position in the first area is displaced according to the main data with the standard locus as a reference, and the record mark position in the second area is displaced according to the cancel data with the standard locus as a reference.

By constructing in this manner, the main data may have some information, while the cancel data may be used to solve or cancel the DC offset of the wobble. The "DC offset of the wobble" means the average value of the displacement of the record mark position with the standard locus as a reference. On the information recording medium, in other words, in addition to a main data area (i.e., the first area) in which the main data is recorded, a cancel area (i.e., the second area) in which the cancel data for canceling the DC offset is also provided by the predetermined data unit. Accordingly, it is possible to certainly improve data reliability.

Further in such a construction of the above described aspect related to the DC offset values of the present invention, the information recording medium may be constructed such that the main data is spread spectrum data obtained by performing spread spectrum with respect to predetermined information.

By this, it is possible to increase the concealment of the main data. Incidentally, the spread spectrum data is randomized by the random data. In some cases, "1" or "0" appears continuously or disproportionately with some probability. In this configuration of the present invention, however, the wobble is formed by combining the spread spectrum data as the main data with the cancel data, so that it is possible to converge the wobble onto the standard locus for a short time.

Also, further in such a construction related to the DC offset values of the above described aspect of the present invention, the information recording medium may be constructed such that a bit row of the cancel data is set to be associated with the DC offset value of the main data.

By this, the cancel data may have any data pattern if it can cancel the DC offset of the main data. By setting the bit row of the cancel data to be associated with the DC offset value of the main data, it is possible to give a meaning to the cancel data. If illegal vendors produce a copy of the information recording medium without knowing the above-described association, it is possible to judge or determine the authenticity of the information recording medium by verifying the bit row of the cancel data.

The above object of the present invention can be also achieved by an information reproducing apparatus for reproducing main data from the above-described aspect of the information recording medium related to the DC offset values of the present invention (including its various aspects), the information reproducing apparatus provided with: a reading device for reading the record mark recorded on the information recording medium; a wobble signal generating device for generating a wobble signal for indicating a displaced position of the record mark on the basis of an output signal from the reading device; a data reproducing device for reproducing the main data and the cancel data on the basis of the generated wobble signal; and an authenticity judging device for comparing the DC offset value of the reproduced main data with the DC offset value of the reproduced cancel data and judging authenticity of the information recording medium on the basis of comparison result of the compared DC offset values.

According to the information reproducing apparatus of the present invention, the information reproducing apparatus reproduces the main data from the above-described information recording medium. In operation, the reading device reads the record mark recorded on the information recording medium and outputs a read signal. Then, the wobble signal generating device generates a wobble signal for indicating the displaced position of the record mark on the basis of the read signal. Then, the data reproducing device reproduces the main data and the cancel data on the basis of the generated wobble signal. Then, the authenticity judging device compares the DC offset value of the reproduced main data with the DC offset value of the reproduced cancel data and finally judges the authenticity of the information recording medium on the basis of the comparison result.

Accordingly, since the cancel data has a data pattern selected so that the DC offset value thereof is equal to that of the main data, if the DC offset value of the reproduced main data does not agree with the DC offset value of the reproduced cancel data, it is possible to judge that the information recording medium is false (i.e., the illegally-copied medium).

In one aspect of the information reproducing apparatus of the present invention, a bit row of the cancel data is set to be associated with the DC offset value of the main data, and the authenticity judging device is provided with: a memory device for storing the DC offset value of the main data and the bit row of the cancel data in association with each other; a detecting device for detecting the DC offset value of the reproduced main data; and a judging device for reading the bit row of the cancel data corresponding to the detected DC offset value from said memory device, comparing the read bit row with the bit row of the cancel data, and judging the authenticity of said information recording medium on the basis of the comparison result of the compared bit rows.

According to this aspect, in advance, the memory device stores the DC offset value of the main data and the bit row of the cancel data in association with each other. Then, in the reproducing operation, the detecting device detects the DC offset value of the reproduced main data. Then, the judging device reads the bit row of the cancel data corresponding to the detected DC offset value from the memory device, compares the read bit row with the bit row of the cancel data, and finally judges the authenticity of the information recording medium on the basis of the comparison result.

In this case, the information recording medium is not judged to be true if the DC offset values of the main data and the cancel data merely agree. It is judged to be true if the cancel data has the bit row corresponding to the DC offset value of the main data. Therefore, it is possible to perform the authenticity judgment more certainly.

The above object of the present invention can be also achieved by an information reproducing method of reproducing main data from the above-described aspect of the information recording medium related to the DC offset values of the present invention (including its various aspects), the information reproducing method provided with: a reading process of reading the record mark recorded on the information recording medium; a wobble signal generating process of generating a wobble signal for indicating a displaced position of the record mark on the basis of an output signal in the reading process; a data reproducing process of reproducing the main data and the cancel data on the basis of the generated wobble signal; and an authenticity judging process of comparing the DC offset value of the reproduced main data with the DC offset value of the reproduced cancel data and judging authenticity of the information recording medium on the basis of comparison result of the compared DC offset values.

According to the information reproducing method of the present invention, in the same manner as the above described information reproducing apparatus of the present invention, it is possible to judge that the information recording medium is false.

The nature, utility, and further features of this invention will be more clearly apparent from the following detailed description with reference to preferred embodiments of the invention when read in conjunction with the accompanying drawings briefly described below.

DETAILED DESCRIPTION OF THE PREFERRED EMBODIMENT

The preferred embodiment of the present invention will be explained with reference to the drawings hereinafter. In the embodiment, a DVD is taken and explained as one example of the information recording medium, but it is to be understood that the present invention is not limited to the embodiment.

<1. Mastering Apparatus>

Figure 1:
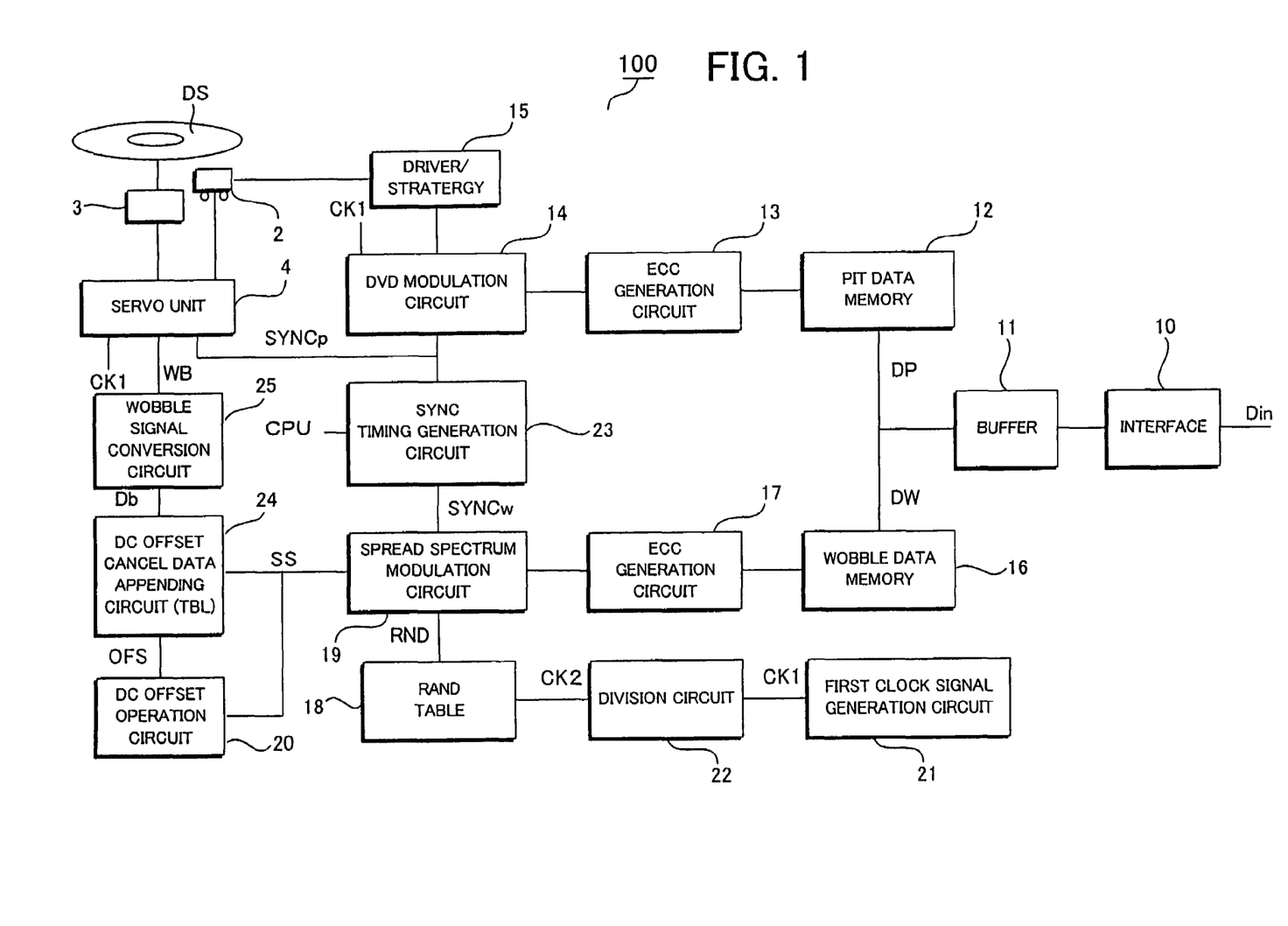
FIG. 1 is a block diagram showing the outline structure of a mastering apparatus associated with an embodiment of the present invention.

FIG. 1 shows the entire structure of a mastering apparatus. A mastering apparatus 100 is intended to make a master disc DS and is provided with: a recording unit 2; a spindle motor 3 for rotating the master disc DS; and a servo unit 4. The master disc DS is made as a glass master on which photoresist is applied, for example. The recording unit 2 is provided with: a laser diode for irradiating laser light; an optical system for focusing the laser light on the master disc DS; and a slider apparatus for moving the laser diode and the optical system as one body in the radial direction of the master disc DS. The laser diode emits the laser light with a power corresponding to a driving signal supplied from a driver 15. The slider apparatus moves the optical system and the laser diode in the radial direction of the master disc DS according to a control signal from the servo unit 4.

A first clock signal CK1 and a pit synchronization signal SYNCp are supplied to the servo unit 4. In synchronization with these signals, the servo unit 4 performs spindle servo for controlling the rotation of the spindle motor 3, focus servo for controlling the focus of the laser light, and slide servo for controlling the slider apparatus. In the slide servo out of them, the control signal is generated by adding a wobble signal WB to a signal for forming a spiral track, and the slider apparatus is controlled by the control signal.

The first clock signal CK1 is generated by a first clock signal generation circuit 21. In the embodiment, the frequency of the first clock signal CK1 is 10.5 MHz. The first clock signal CK1 is a time reference for pit data DP. A division circuit 22 frequency-divides the first clock signal CK1 and generates a second clock signal CK2 or the like. The frequency of the second clock signal CK2 is 420 KHz. The second clock signal CK2 is used for the generation of the wobble signal WB and is a time reference for it.

Figure 2:
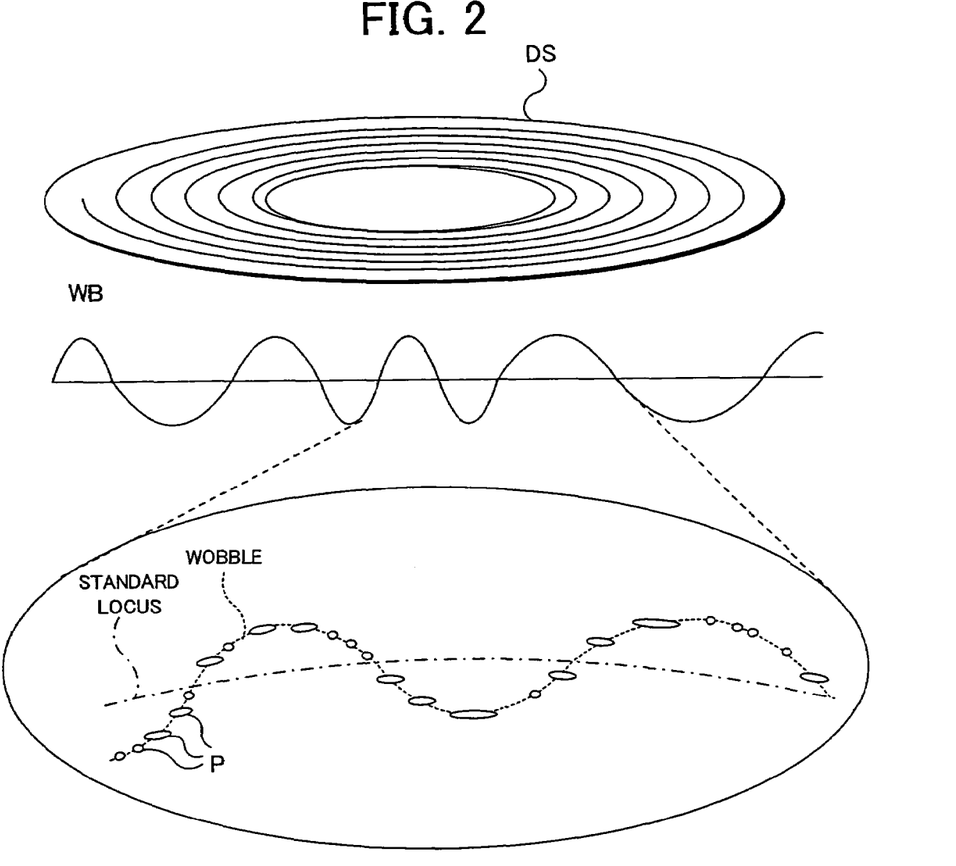
FIG. 2 is an explanatory diagram showing tracks formed on a master disc DS.

FIG. 2 shows the wobble formed on the master disc DS. The wobble is a series of record marks. The record marks are formed as pits P on the master disc DS. The pit data DP is recorded according to the variable length (i.e., the long or short length) of the record mark. The wobble is formed along a spiral standard locus, and the wobble, in close-up, meanders or wobbles in the direction crossing the standard locus. The wobble has a shape according to the wobble signal WB.

The explanation is back now in FIG. 1. Input data Din is supplied from external equipment to the mastering apparatus 100. The input data Din is taken into a buffer 11 through an interface 10. The input data Din taken into the buffer 11 is divided into the pit data DP and wobble data DW under the control of a Central Processing Unit (CPU), and they are transferred to a pit data memory 12 and a wobble data memory 16, respectively. The pit data DP includes image and audio information, for example. The wobble data DW includes information for copy control for the prevention of illegal copying or the like, for example.

The CPU reads the pit data DP from the pit data memory 12 and supplies it to an Error-Correcting Code (ECC) generation circuit 13. After scrambling in which the data order of the pit data DP is rearranged according to a preset rule, the ECC generation circuit 13 generates an error-correcting code and appends it to the pit data DP. A DVD modulation circuit 14 generates the pit data DP by modulating the output data of the ECC generation circuit 13. The pit synchronization signal SYNCp generated on a SYNC timing generation circuit 23 is appended to the pit data DP.

In the meantime, the wobble data DW stored in the wobble data memory 16 is read from there and supplied to an ECC generation circuit 17 under the control of the CPU. The ECC generation circuit 17 generates an error-correcting code on the basis of the wobble data DW and appends it to the wobble data DW. A random pattern used for spread spectrum is stored on a RAND table 18. The random pattern corresponds to a spread code and is a bit row generated by using a random function. The second clock signal CK2 is supplied to the RAND table 18. The random pattern is read in synchronization with the second clock signal CK2. The read random pattern is supplied to a spread spectrum modulation circuit 19 as random data RND. After appending a wobble synchronization signal SYNCw to the wobble data DW, the spread spectrum modulation circuit 19 multiplies it with the random data RND and generates the spread spectrum data SS. The spread spectrum modulation circuit 19 can be constructed from an eXclusive OR (XOR) circuit, for example.

A DC offset operation circuit 20 operates a DC offset value OFS by a predetermined data unit of the spread spectrum data SS. The DC offset value OFS is generated by associating "1" of the spread spectrum data SS with "1" and associating "0" of the spread spectrum data SS with "−1" and by accumulating these conversion values by the predetermined data unit. For example, if the predetermined data unit is 16 bits (2 bytes) and the spread spectrum data SS is (0010101110111101), the DC offset value OFS is "4".

Figure 3:
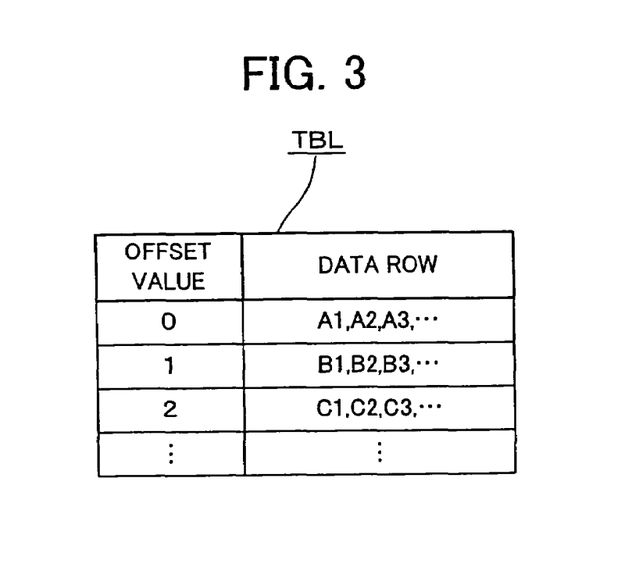
FIG. 3 is an explanatory diagram showing the memory content of a DC offset cancel data row table TBL.

A DC offset cancel data appending circuit 24 is provided with a DC offset cancel data row table TBL. On the DC offset cancel data row table TBL, the offset value OFS and a data row are stored in association with each other as shown in FIG. 3. The data row indicates the bit row of DC offset cancel data Da, and is set to cancel the corresponding DC offset value OFS. The DC offset cancel data appending circuit 24 generates the DC offset cancel data Da by reading the data row from the DC offset cancel data row table TBL on the basis of the DC offset value OFS supplied from the DC offset operation circuit 20, and generates record data Db in which the DC offset is canceled by appending the generated DC offset cancel data Da to the spread spectrum data SS.

A wobble signal conversion circuit 25 converts the record data Db into the wobble signal WB. The wobble signal conversion circuit 25 in the embodiment is constructed from a band pass filter, a low pass filter, or the like, and it band limits the record data Db, thereby generate the wobble signal WB.

Figure 4:
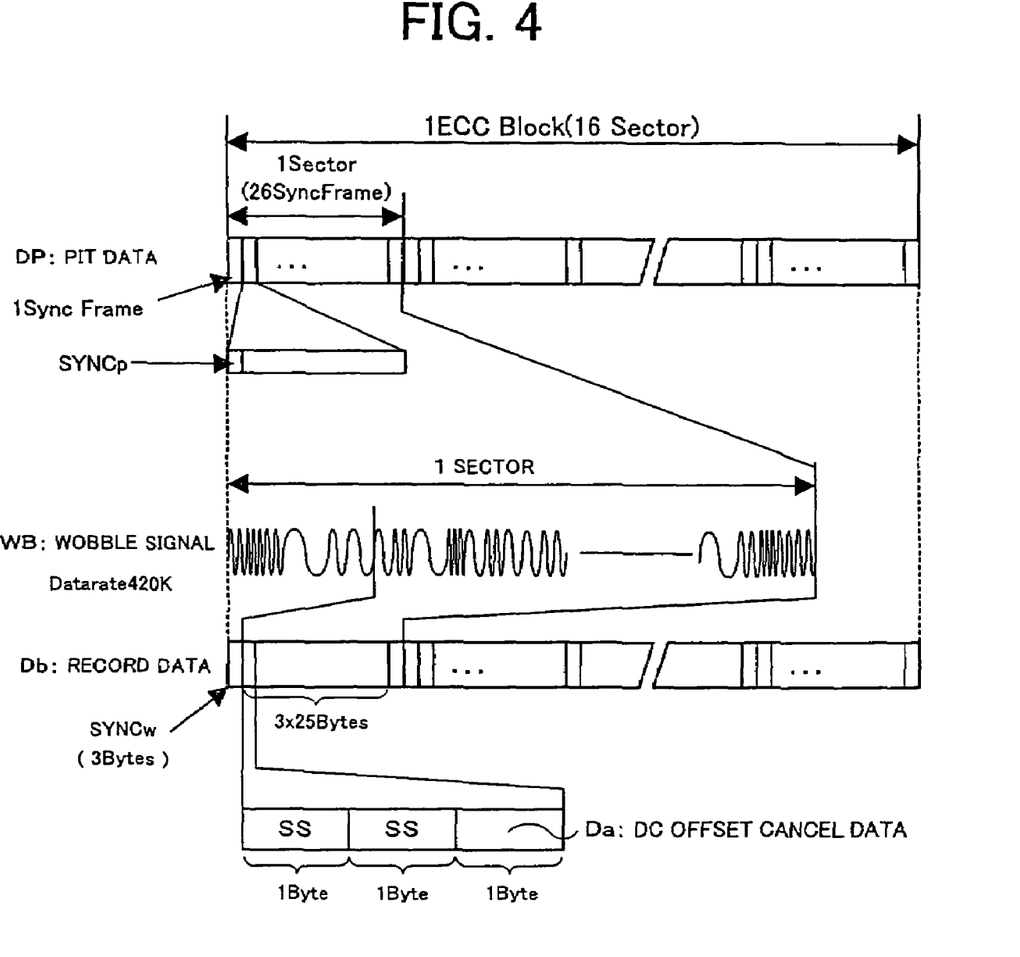
FIG. 4 is an explanatory diagram showing the data formats of pit data and record data.

FIG. 4 shows the data formats of the pit data and the record data. In the embodiment, the data unit of the pit data DP to which the error-correcting code is appended is referred to as an "ECC block". One ECC block includes 16 sectors, and one sector includes 26 synchronization frames. The pit synchronization signal SYNCp is placed at the head of the synchronization frame. At the head of the record data Db, 3 bytes of the wobble synchronization signal SYNCw is placed, correspondingly to one sector of the pit data DP. Following this, 3×25 bytes of data is placed. Then, one byte of the DC offset cancel data Da is appended to 2 bytes of the spread spectrum data SS. This causes the DC offset of the record data Db to be canceled by the predetermined data unit of the spread spectrum data SS (which is 2 bytes in the embodiment).

The unit for canceling the DC offset may be a predetermined data unit in the case of regarding, as a reference, the wobble data DW before spread spectrum is performed. Alternatively, it may also be regarded as a predetermined data unit with the record data Db as a reference. It is also possible not to include the wobble synchronization signal SYNCw in the record data Db. Moreover, if including the wobble synchronization signal SYNCw, the record data Db itself is preferably made with a data pattern in which the DC offset is canceled. Incidentally, the spread spectrum data SS corresponds to the above-described main data, and the DC offset cancel data Da corresponds to the above-described cancel data.

Since the spread spectrum data SS is obtained by multiplying the random data RND and the wobble data DW, "1" or "0" continues in some combinations of the symbols. However, the DC offset cancel data Da is appended to the spread spectrum data SS by the predetermined data unit, so that the wobble signal WB in the embodiment has such a waveform that the DC offset is canceled. By forming the record mark according to the wobble signal WB, the wobble is formed so that the average value of the displacement of the record mark position is zero by the predetermined data unit with the standard locus as a reference.

Now, the record data Db is regarded as a group of pairs, each including the spread spectrum data SS and the DC offset cancel data Da, and one pair is regarded as the data unit. In this case, the wobble corresponding to the data unit is provided with a first area corresponding to the spread spectrum data SS and a second area corresponding to the DC offset cancel data Da. The record mark position in the first area corresponds to the spread spectrum data SS, so that the average value of the displacement of the record mark position with the standard locus as a reference is not necessarily zero. On the other hand, the record mark position in the second area corresponds to the DC offset cancel data Da. Thus, the average value of the displacement of the record mark position in the second area is such as to cancel the average value of the displacement of the record mark position in the first area. As a result, upon looking at the wobble by the predetermined data unit, the average value of the displacement of the record mark position is zero with the standard locus as a reference. In other words, in addition to a main data area in which the spread spectrum data SS as the main data is recorded, a cancel area in which the DC offset cancel data Da for canceling the DC offset is also provided by the predetermined data unit.

In the embodiment, as described above, the record data Db and the wobble signal WB are generated so as to cancel the DC offset by the predetermined data unit of the spread spectrum data SS. Thus, the wobble formed on the master disc DS converges onto the standard locus for a short time. The master disc DS on which the record mark is formed by the mastering apparatus 100 is developed to be a resist master. After that, one metal master is made through an electroforming process of plating on the basis of the resist master, and then a plurality of mothers are made from the one metal master. Furthermore, a plurality of stampers are made from the plurality of mothers. An optical disc 1 is produced by pressing resin, such as plastic, by using the stamper.

The wobble corresponding to the wobble signal WB is formed on the optical disc 1, and the wobble is shaped such that the DC offset converges for a short time. This enables the position of an optical pickup to return to the standard locus for a short time upon reproducing the optical disc 1. This decreases tracking error by track jumping and crosstalk from an adjacent track upon reproducing the optical disc 1, thereby to improve data reliability.

<2. Information Reproducing Apparatus>

<2-1: Entire Structure of Information Reproducing Apparatus>

Figure 5:
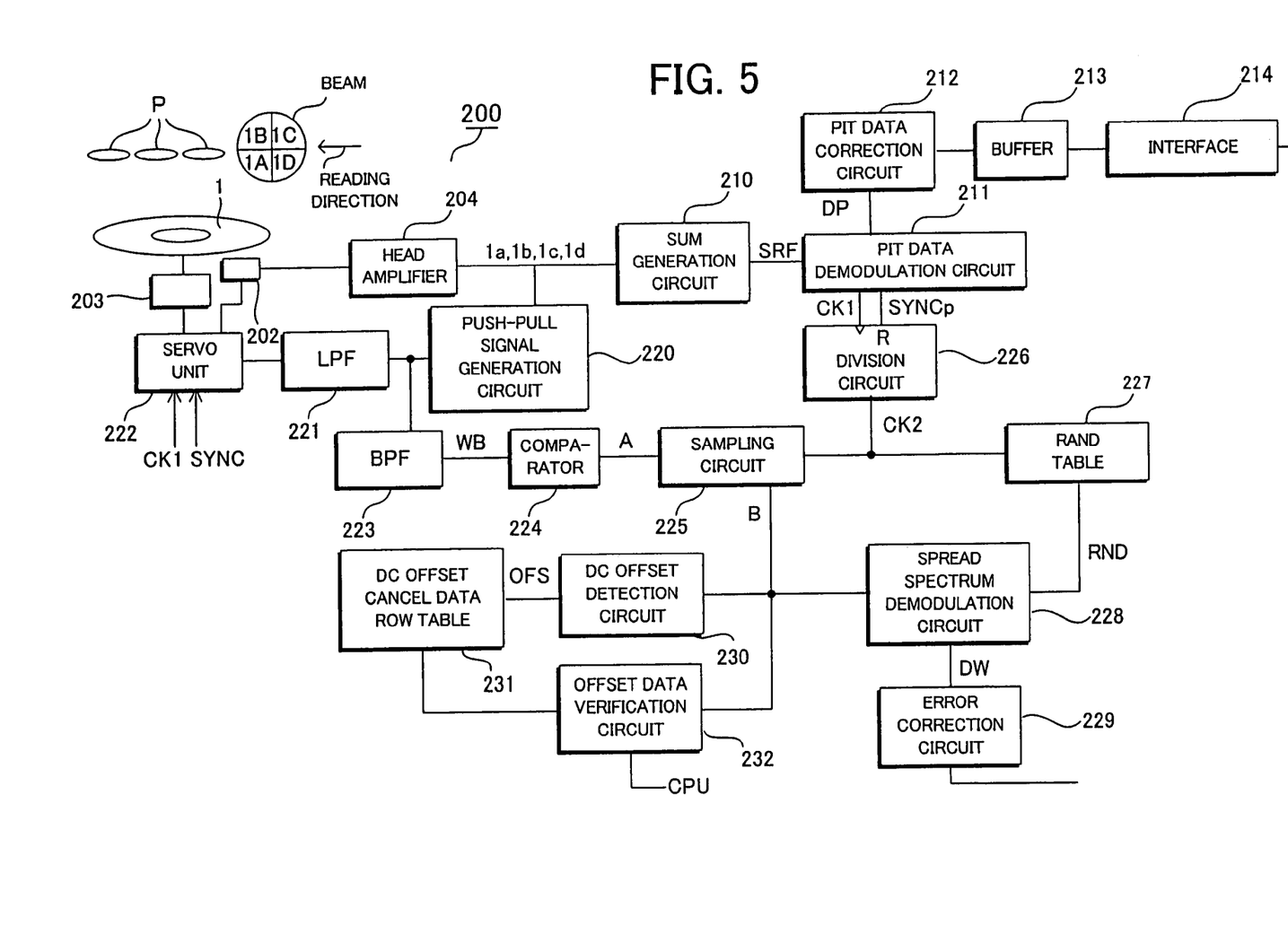
FIG. 5 is a block diagram showing the entire structure of an information reproducing apparatus.

Next, the information reproducing apparatus will be explained. FIG. 5 shows the entire structure of an information reproducing apparatus 200. On the optical disc 1, the pit data DP synchronized with the first clock signal CK1 is recorded by the long or short length of the record mark. The record mark in the embodiment is a pit, and the track is constructed from a pit row. The track has a meandering or wobbling shape corresponding to the wobble signal WB generated on the basis of the record data Db. The wobble signal WB is synchronized with the second clock signal CK2. The first clock signal CK1 has a frequency N times (N: natural number) as large as that of the second clock signal CK2. In the embodiment, N=25, the frequency of the second clock signal CK2 is 420 KHz, and the frequency of the first clock signal CK1 is 10.5 MHz.

The information reproducing apparatus 200 is provided with: an optical pickup 202 for irradiating a reproduction beam onto the optical disc 1 and for outputting a signal corresponding to reflected light; a spindle motor 203 for controlling the rotation of the optical disc 1; and a servo unit 222. The first clock signal CK1 and the pit synchronization signal SYNCp are supplied to the servo unit 222. In synchronization with these signals, the servo unit 222 performs spindle servo for controlling the rotation of the spindle motor 203 and focus servo and tracking servo for controlling the relative position of the optical pickup 202 with respect to the optical disc 1.

The optical pickup 202 is provided with: a laser diode for irradiating the reproduction beam; and a four-division detection circuit (not-illustrated). The four-division detection circuit divides by 4 the reflected light of the reproduction beam into areas 1A, 1B, 1C, and 1D shown in FIG. 5, and outputs each signal corresponding to the quantity of light in respective one of the areas. A head amplifier 204 amplifies each output signal of the optical pickup 202, and outputs a divisional read signal 1a corresponding to the area 1A, a divisional read signal 1b corresponding to the area 1B, a divisional read signal 1c corresponding to the area 1C, and a divisional read signal 1d corresponding to the area 1D. Incidentally, the optical pickup 202 and the head amplifier 204 correspond to the "reading device" described above.

A sum generation circuit 210 is constructed from an addition circuit for adding the divisional read signals 1a, 1b, 1c, and 1d and for outputting a sum read signal SRF. Incidentally, the sum read signal SRF represents the long or short length of the record mark.

Figure 6:
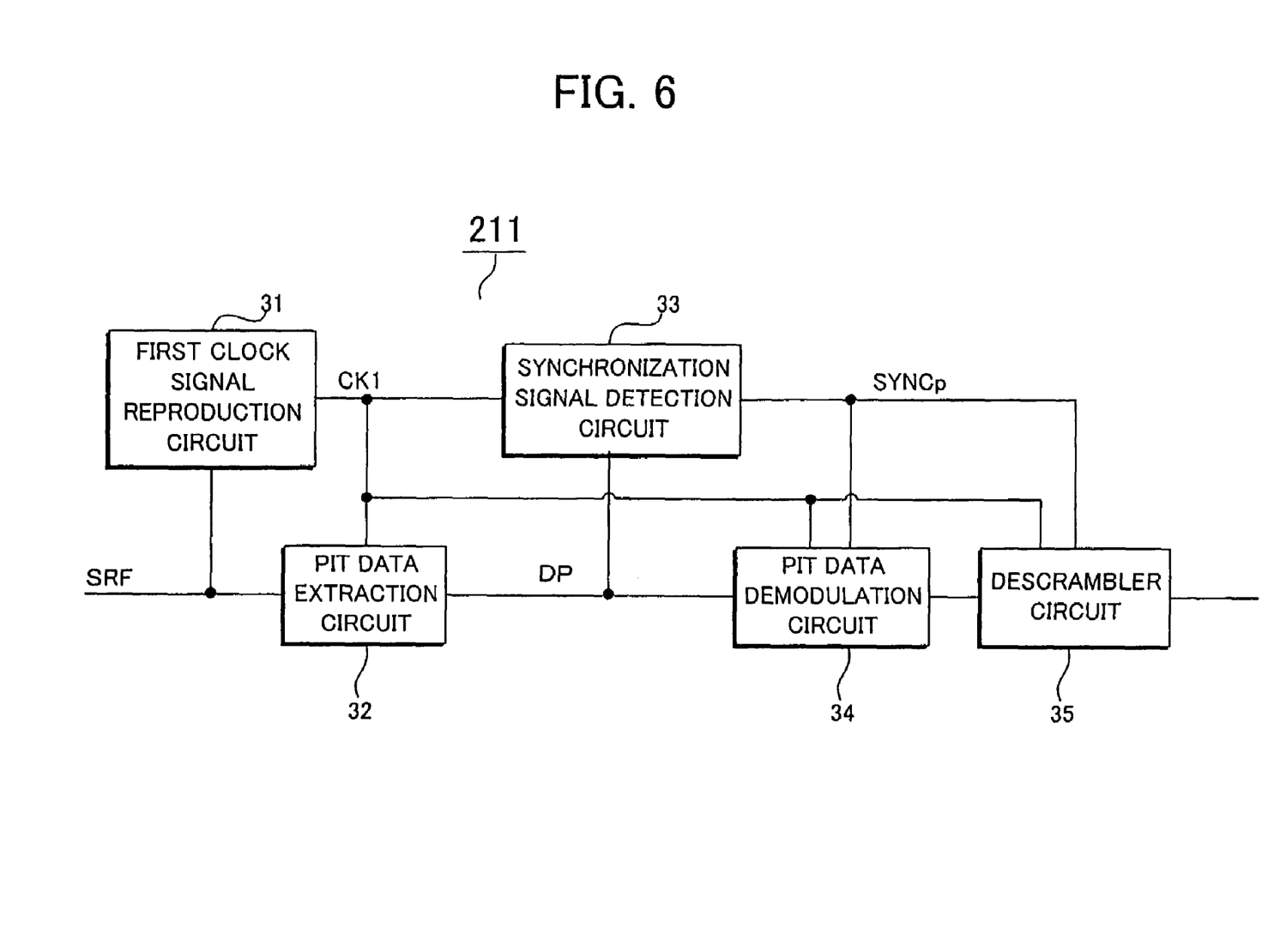
FIG. 6 is a block diagram showing the structure of a pit data demodulation circuit.

A pit data demodulation circuit 211 reproduces the pit data DP and generates the first clock signal CK1 on the basis of the sum read signal SRF. FIG. 6 shows the structure of the pit data demodulation circuit 211. As shown in FIG. 14, the pit data demodulation circuit 211 is provided with: a first clock signal reproduction circuit 31; a pit data extraction circuit 32; a synchronization signal detection circuit 33; a pit data demodulation circuit 34; and a descrambler circuit 35.

The first clock signal reproduction circuit 31 reproduces the first clock signal CK1 synchronized with the pit data DP on the basis of the sum read signal SRF. The pit data extraction circuit 32 samples, with the first clock signal CK1, a binary signal obtained by binarizing the sum read signal SRF and reproduces the pit data DP.

The synchronization signal detection circuit 33 detects a synchronization pattern included in the reproduced pit data DP and generates the pit synchronization signal SYNCp. The synchronization pattern is a particular data pattern which is not included in other pit data, and has a constant cycle. The pit synchronization signal SYNCp indicates the timing of the synchronization pattern.

The pit data demodulation circuit 34 generates reproduction data by demodulating the reproduced pit data DP with a predetermined table, with the pit synchronization signal SYNC being as a reference position. For example, if Eight to Fourteen Modulation (EFM) is used as a modulating method, the demodulation processing is performed in which 14 bits of the pit data DP is converted into 8 bits of the reproduction data. The descrambler circuit 35 performs descrambling in which the order of the reproduction data is rearranged according to a preset rule, and outputs the processed reproduction data.

The reproduction data obtained in this manner is supplied to a pit data error correction circuit 212 shown in FIG. 5, and after error correcting and interpolating therein, it is stored into a buffer 213. An interface 214 sequentially reads the data stored in the buffer 213, converts it into a predetermined output form, and outputs it to external equipment.

A push-pull signal generation circuit 220 calculates (1a+1d)−(1b+1c) and generates a push-pull signal. The component (1a+1d) corresponds to the areas 1A and 1D which are on the left side with respect to the reading direction, while the component (1b+1c) corresponds to the areas 1B and 1C which are on the right side with respect to the reading direction. Namely, if the reproduction beam inclines to the left side with respect to the pit, the push-pull signal will have positive polarity with the amplitude center thereof as a standard. If the reproduction beam is positioned in the center of the pit, the value of the push-pull signal will be in the amplitude center thereof. If the reproduction beam inclines to the right side with respect to the pit, the push-pull signal will have negative polarity with the amplitude center thereof as a standard. The relative position between the reproduction beam and the pit changes according to the meandering of the wobble, and the value of the push-pull signal represents the relative position between the reproduction beam and the pit. Namely, the push-pull signal is a signal corresponding to the meandering of the wobble.

The push-pull signal is outputted through a low pass filter 221 to the servo unit 222. The servo unit 222 performs tracking control on the basis of the push-pull signal. The optical disc 1 in the embodiment is produced by using the master disc DS made by the above-described mastering apparatus 100, so that the DC offset of the wobble is canceled by the predetermined data unit of the spread spectrum data SS. Therefore, tracking servo is capable of returning the position of the optical pickup 202 to the standard locus for a short time. As a result, it is possible to decrease tracking error by jumping to an adjacent track and crosstalk from the adjacent track, thereby to improve data reliability.

Moreover, the push-pull signal is supplied to a band pass filter 223. The pass band of the band pass filter 223 is set to extract the wobble signal WB upon recording from the push-pull signal. Therefore, the band pass filter 223 constitutes the "wobble signal generating device" described above with the push-pull signal generation circuit 220, and the output signal thereof is such as to reproduce the wobble signal WB from the optical disc 1.

Figure 7:
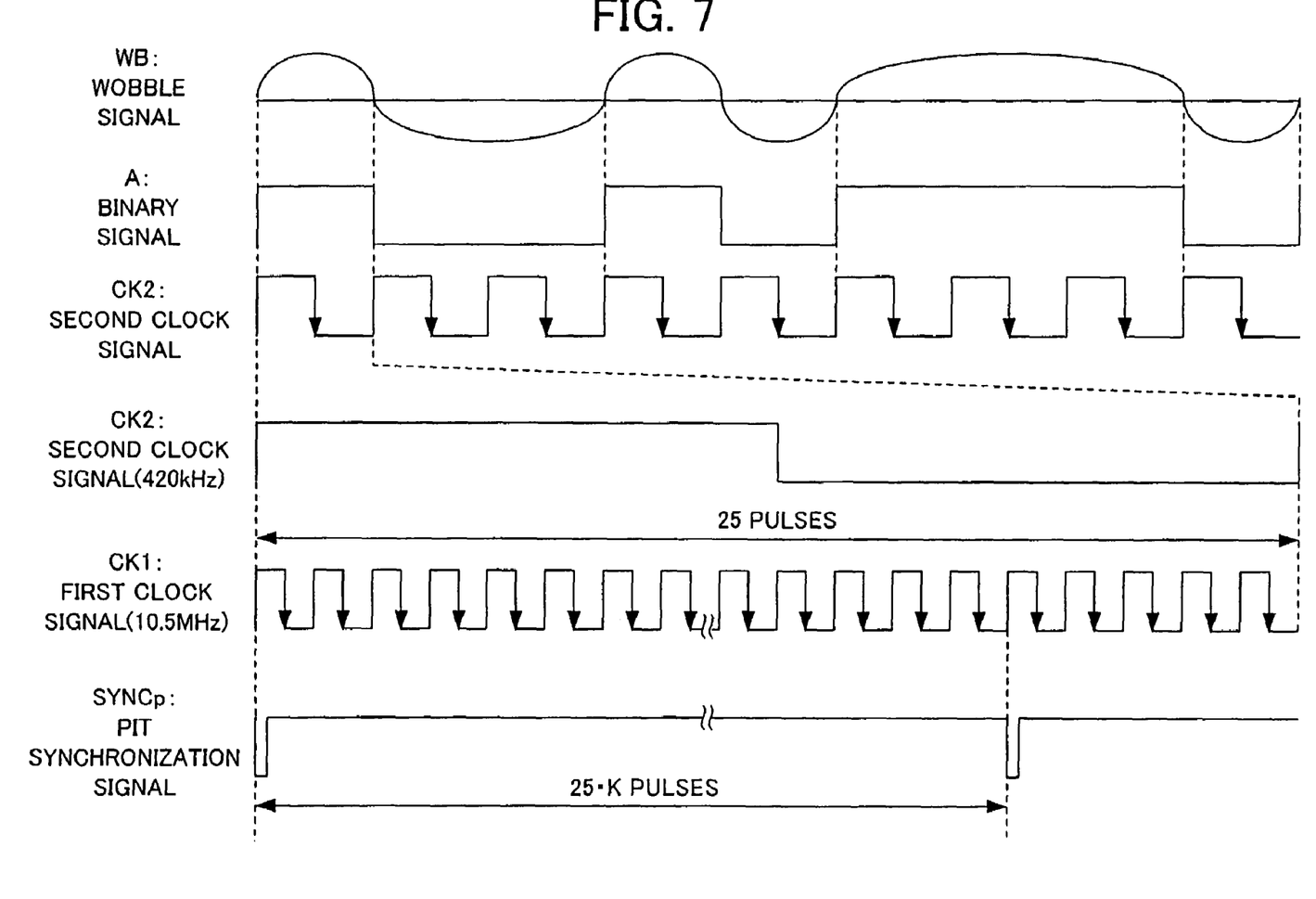
FIG. 7 is a timing chart of a wobble signal WB, a binary signal A, a first clock signal CK1, a second clock signal CK2, and a pit synchronization signal SYNCp.

FIG. 7 shows a timing chart of the wobble signal WB, a binary signal A, the first clock signal CK1, the second clock signal CK2, and the pit synchronization signal SYNCp. A comparator 224 outputs the binary signal A obtained by binarizing the wobble signal WB. Since the wobble signal WB has a low frequency, the inclination thereof near zero crossing is relatively mild. Thus, the binary signal A has a large jitter component. A sampling circuit 225 samples the binary signal A by using the second clock signal CK2 and extracts the data, to thereby reproduce the reproduction data B. Incidentally, the comparator 224 and the sampling circuit 225 correspond to the data reproducing device.

In the embodiment, the frequency of the first clock signal CK1 is 10.5 MHz and the frequency of the second clock signal CK2 is 420 KHz. Thus, a division circuit 226 generates the second clock signal CK2 by frequency-dividing the first clock signal CK1 by 25. Therefore, as shown in FIG. 7, one cycle of the second clock signal CK2 can contain therein 25 first clock signals CK1. The division circuit 226 is set to be reset if the voltage of a reset terminal R is active (at a low level), and the pit synchronization signal SYNCp is supplied to the reset terminal R. Therefore, the second clock signal CK2 is reset by the trailing of the pit synchronization signal SYNCp, and its phase is determined from the pit synchronization signal SYNCp.

The synchronization patterns are inserted in the pit data DP with a cycle of 25×K (K: natural number) bits, and each has such a relationship that the synchronization pattern agrees with the leading or rising edge of the second clock signal CK2. Namely, the synchronization pattern has a frequency which is a natural multiple of that of the second clock signal CK2. In this case, if the pit synchronization signal SYNC becomes active at the timing shown in FIG. 7, the division circuit 226 is reset and the phases of the pit synchronization signal SYNCp and the second clock signal CK2 are adjusted. This makes it possible to adjust the occurrence timing of the leading edge of the second clock signal CK2 by using the first clock signal CK1 with a higher frequency. Therefore, even if the edge of the binary signal A is influenced and wobbled by jitter, it is possible to accurately extract the reproduction data B.

Back in FIG. 5, the explanation goes on. A random pattern used for the spread spectrum modulation upon recording is stored on a RAND table 227. The random pattern corresponds to a spread code and is a bit row generated by using a random function. The second clock signal CK2 is supplied to the RAND table 227. By reading the random pattern in synchronization with the second clock signal CK2, the random data RND is generated. The generated random data RND is supplied to a spread spectrum demodulation circuit 228.

The spread spectrum demodulation circuit 228 is provided with: a separation circuit for separating the spread spectrum data SS from the reproduction data B; and a multiplication circuit (e.g. the XOR circuit). The spread spectrum data SS extracted by the separation circuit is multiplied with the random data RND on the multiplication circuit. This causes the wobble data to be reproduced. In this case, a signal which is not in an original signal band is converted into a signal which is out of the band by the multiplication. The wobble data DW reproduced in this manner is outputted after error correcting on an error correction circuit 229.

Then, a DC offset detection circuit 230 separates the spread spectrum data SS from the reproduction data B and detects the DC offset value OFS thereof. The DC offset detection circuit 230 corresponds to the above-described "detecting device". In the embodiment, since one byte of the DC offset cancel data Da is appended to 2 bytes of the spread spectrum data SS, the DC offset value OFS is calculated with respect to the reproduced 2 bytes of the spread spectrum data SS. Incidentally, in the case of separating the spread spectrum data SS from the reproduction data B, a reference for determining where the spread spectrum data SS starts from is required. With regard to this, the pit synchronization signal SYNCp or the wobble synchronization signal SYNCw may be the reference.

The DC offset value OFS detected on the DC offset detection circuit 230 is supplied to a DC offset cancel data row table 231. The memory content of the DC offset cancel data row table 231 is the same as that of the table TBL upon recording (refer to FIG. 3). The DC offset cancel data row table 231 corresponds to the above-described "memory device". A data row corresponding to the DC offset value OFS is read from the DC offset cancel data row table 231 and is supplied to an offset data verification circuit 232. The offset data verification circuit 232 compares or verifies the DC offset cancel data Da separated from the reproduction data B with the read data row. The offset data verification circuit 232 generates authenticity judgment information for indicating "truth" if the both agree and indicating "falsehood" if the both do not agree, and outputs it to the CPU. The offset data verification circuit 232 corresponds to the above-described "authenticity judging device".

The DC offset cancel data Da is such as to cancel the DC offset of the spread spectrum data SS by the predetermined data unit, so that it may have many data patterns. In the embodiment, a bit row associated with the DC offset value OFS is recorded on the optical disc 1 as the DC offset cancel data Da. Therefore, the authenticity of the optical disc 1 can be judged by obtaining a data pattern set in advance on the basis of the DC offset value OFS of the reproduced spread spectrum data SS and by comparing or verifying this pattern with the DC offset cancel data Da reproduced form the optical disc 1.

Illegal copy vendors do not know the relationship between the DC offset value OFS and the DC offset cancel data Da, so that even if they copy the optical disc 1 so as to cancel the DC offset of the wobble, it is possible to judge that the optical disc 1 is illegally copied, by the above-described comparison or verification.

The CPU allows the reproduction of the optical disc 1 if the authenticity judgment information indicates truth. On the other hand, it stops the reproduction of the optical disc 1 and controls a loading mechanism to eject the optical disc 1 from the apparatus if the authenticity judgment information indicates falsehood. This makes it possible to effectively forbid the reproduction of the illegally copied optical disc 1.

<3. Modified Example>

The present invention is not limited to the above-described embodiment and can be modified as follows, for example.

(1) In the above-described embodiment, the spread spectrum data SS is used as the main data. However, the present invention is not limited to this, and any data may be used. Moreover, the content of the main data is not limited to management information about copyright, such as copying.

(2) In the above-described embodiment, the bit row of the DC offset cancel data Da is defined as a particular data pattern associated with the DC offset value OFS of the spread spectrum data SS. However, the present invention is not limited to this, and any DC offset cancel data Da may be adopted if it can cancel the DC offset of the spread spectrum data SS. For example, it is possible to store the DC offset value OFS and a plurality of data rows with them associated with each other on the DC offset cancel data row table TBL shown in FIG. 3, and to randomly select the data row from them, thereby to generate the DC offset cancel data Da. In this case, on the information reproducing apparatus 200, it is possible to judge the authenticity of the optical disc 1 by separating the spread spectrum data SS and the DC offset cancel data Da from the reproduction data B, by detecting the respective DC offset values OFS on a detection circuit, and by judging whether or not the both agree on an authenticity judgment circuit. Moreover, it is also possible to set a rule for selecting the bit row and specify the bit row of the DC offset cancel data Da according to this rule upon reproducing.

(3) In the above-described embodiment, the DC offset is canceled by 2 byte unit of the spread spectrum data SS. However, the present invention is not limited to this, and any unit may be used if the DC offset is canceled by a predetermined data unit. For example, the DC offset may be canceled by a synchronization frame unit of the spread spectrum data SS, a synchronization frame unit of the pit data DP, or one ECC block unit of the pit data DP. Namely, in addition to a data area in which the spread spectrum data SS as the main data is recorded, a cancel area in which the DC offset cancel data Da for canceling the DC offset may be provided by the predetermined data unit.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description and all changes which come within the meaning and range of equivalency of the claims are therefore intended to be embraced therein.

The entire disclosure of Japanese Patent Application No. 2003-186783 filed on Jun. 30, 2003 including the specification, claims, drawings and summary is incorporated herein by reference in its entirety.

What is claimed is:

1. An information recording medium on which a wobble is formed by displacing a record mark position in a direction crossing a spiral standard locus according to record data,
wherein the wobble is formed such that an average value of displacement of the record mark position with the standard locus as a reference is zero for each predetermined data unit of the record data,
the wobble corresponding to the predetermined data unit comprises:
a first area; and
a second area,
wherein the average value of the displacement of the record mark position with the standard locus as a reference in the second area is set to cancel the average value of the displacement of the record mark position with the standard locus as a reference in the first area,
the record data corresponding to the predetermined data unit comprises:
main data; and
cancel data having a DC offset value to cancel a DC offset value of the main data,
the record mark position in the first area is displaced according to the main data with the standard locus as a reference, and
the record mark position in the second area is displaced according to the cancel data with the standard locus as a reference.

2. The information recording medium according to claim 1, wherein the main data is spread spectrum data obtained by performing spread spectrum with respect to predetermined information.

3. The information recording medium according to claim 1, wherein a bit row of the cancel data is set to be associated with the DC offset value of the main data.

4. An information reproducing apparatus for reproducing main data from an information recording medium on which a wobble is formed by displacing a record mark position in a direction crossing a spiral standard locus according to record data, wherein the wobble is formed such that an average value of displacement of the record mark position with the standard locus as a reference is zero for each predetermined data unit of the record data, the wobble corresponding to the predetermined data unit comprises: a first area; and a second area, the average value of the displacement of the record mark position with the standard locus as a reference in the second area is set to cancel the average value of the displacement of the record mark position with the standard locus as a reference in the first area, the record data corresponding to the predetermined data unit comprises: the main data; and cancel data having a DC offset value to cancel a DC offset value of the main data, the record mark position in the first area is displaced according to the main data with the standard locus as a reference, and the record mark position in the second area is displaced according to the cancel data with the standard locus as a reference, said information reproducing apparatus comprising:

a reading device for reading the record mark recorded on said information recording medium;

a wobble signal generating device for generating a wobble signal for indicating a displaced position of the record mark on the basis of an output signal from said reading device;

a data reproducing device for reproducing the main data and the cancel data on the basis of the generated wobble signal; and an authenticity judging device for comparing the DC offset value of the reproduced main data with the DC offset value of the reproduced cancel data and judging authenticity of said information recording medium on the basis of comparison result of the compared DC offset values.

5. The information reproducing apparatus according to claim 4, wherein a bit row of the cancel data is set to be associated with the DC offset value of the main data, and said authenticity judging device comprises:

a memory device for storing the DC offset value of the main data and the bit row of the cancel data in association with each other;

a detecting device for detecting the DC offset value of the reproduced main data; and a judging device for reading the bit row of the cancel data corresponding to the detected DC offset value from said memory device, comparing the read bit row with the bit row of the cancel data, and judging the authenticity of said information recording medium on the basis of the comparison result of the compared bit rows.

6. An information reproducing method of reproducing main data from an information recording medium on which a wobble is formed by displacing a record mark position in a direction crossing a spiral standard locus according to record data, wherein the wobble is formed such that an average value of displacement of the record mark position with the standard locus as a reference is zero for each predetermined data unit of the record data, the wobble corresponding to the predetermined data unit comprises: a first area; and a second area, the average value of the displacement of the record mark position with the standard locus as a reference in the second area is set to cancel the average value of the displacement of the record mark position with the standard locus as a reference in the first area, the record data corresponding to the predetermined data unit comprises: the main data; and cancel data having a DC offset value to cancel a DC offset value of the main data, the record mark position in the first area is displaced according to the main data with the standard locus as a reference, and the record mark position in the second area is displaced according to the cancel data with the standard locus as a reference, said information reproducing method comprising:

a reading process of reading the record mark recorded on said information recording medium;

a wobble signal generating process of generating a wobble signal for indicating a displaced position of the record mark on the basis of an output signal in said reading process;

a data reproducing process of reproducing the main data and the cancel data on the basis of the generated wobble signal; and an authenticity judging process of comparing the DC offset value of the reproduced main data with the DC offset value of the reproduced cancel data and judging authenticity of said information recording medium on the basis of comparison result of the compared DC offset values.

\* \* \* \* \*